(12) United States Patent
Holzapfel et al.

(10) Patent No.: US 7,549,234 B2
(45) Date of Patent: Jun. 23, 2009

(54) METHOD FOR MOUNTING A SCALE ON A SUPPORT AND ARRANGEMENT WITH A SUPPORT AND A SCALE

(75) Inventors: Wolfgang Holzapfel, Obing (DE); Peter Speckbacher, Kirchweidach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/715,637

(22) Filed: Mar. 8, 2007

(65) Prior Publication Data
US 2007/0227027 A1    Oct. 4, 2007

(30) Foreign Application Priority Data
Mar. 29, 2006    (DE) ................. 10 2006 014 789

(51) Int. Cl.
*G01D 5/347*    (2006.01)
*G01D 5/00*    (2006.01)

(52) U.S. Cl. ..................................................... 33/706
(58) Field of Classification Search ................ 33/706
See application file for complete search history.

(56) References Cited

U.S. PATENT DOCUMENTS

| | | | |
|---|---|---|---|
| 4,766,515 A | 8/1988 | Bollen et al. | |
| 5,838,529 A | 11/1998 | Shufflebotham et al. | |
| 6,766,587 B2 * | 7/2004 | Kawada | 33/702 |
| 6,772,531 B1 * | 8/2004 | Henshaw et al. | 33/706 |
| 6,798,588 B2 | 9/2004 | Vogt | |
| 6,867,377 B2 * | 3/2005 | Anderson et al. | 174/254 |
| 7,196,770 B2 * | 3/2007 | Baselmans et al. | 355/53 |
| 7,259,373 B2 * | 8/2007 | Zani et al. | 250/309 |
| 2003/0165043 A1 | 9/2003 | Logan et al. | |
| 2004/0263846 A1 | 12/2004 | Kwan | |
| 2006/0078806 A1 * | 4/2006 | Hansen | 430/5 |
| 2007/0137059 A1 * | 6/2007 | Holzapfel et al. | 33/706 |
| 2008/0024748 A1 * | 1/2008 | Zaal et al. | 355/72 |

FOREIGN PATENT DOCUMENTS

| | | | |
|---|---|---|---|
| DE | 101 53 147 A1 | 5/2003 | |
| EP | 0 288 613 A1 | 11/1988 | |
| JP | 01189509 A * | 7/1989 | 33/706 |

* cited by examiner

*Primary Examiner*—Christopher W Fulton
(74) *Attorney, Agent, or Firm*—Brinks Hofer Gilson & Lione

(57) ABSTRACT

A measuring arrangement including a support and a scale having a measuring graduation, wherein the scale is fixed on the support by a mounting force generated via electrostatic clamping.

19 Claims, 10 Drawing Sheets

METHOD FOR MOUNTING A SCALE ON A SUPPORT AND ARRANGEMENT WITH A SUPPORT AND A SCALE

Applicants claim, under 35 U.S.C. § 119, the benefit of priority of the filing date of Mar. 29, 2006 of a German patent application, copy attached, Serial Number 10 2006 014 789.8, filed on the aforementioned date, the entire contents of which is incorporated herein by reference.

BACKGROUND

1. Field of the Invention

The present invention relates to a method for mounting a scale having a measuring graduation on a support, as well as to an arrangement with a support and with a scale which is releasably, but yet stably, fastened thereon.

2. Discussion of Related Art

For measuring the relative position of two machine elements, a scale must be fastened on one of the machine elements and a scanning unit on the other one of machine elements which are movable in relation to each other. A measuring graduation of the scale is scanned in the course of position measurement.

For a highly accurate position measurement it is necessary for the scale to be maintained stably and free from drifting on the support. A high degree of stability and freedom from drifting in the nano range and sub-nano range requires an extremely short force path, which should be restricted to the contact face, if possible, and should not include the entire thickness of the scale.

For example, a short force path, if possible restricted to the contact face, can be achieved by bonding (atomic van der Waals forces). In this case scales made of glass or glass-ceramic material with negligible coefficients of expansion are preferably employed. These scales can be easily worked, so that here bonding at optically polished counter-faces is customary, such as described in DE 101 53 147 A1. Bonding is a fastening method for scales which is very drift resistant. However, with bonding there is the danger that the scale peels off or is partially loosened. Therefore the outer edges of a bonded scale can be unstable if alternating loads occur at the edge (for example because of acceleration or temperature variations), and these edge zones therefore repeatedly peel off and are bonded again. Furthermore, a bonded scale is very difficult to remove from a support, and therefore an exchange of a damaged scale is possible only with difficulty.

A further known method for mounting a scale on a support is gluing in the area of the contact face. Depending on the type of the adhesive and the thickness of the glued place, distortions between the support and the scale because of shrinking processes can occur, which lead to non-reproducible linear errors in the scale. The shrinking processes in the adhesive are induced, for example, by the aging of the adhesive or by changes in temperature and humidity. Glued-on scales are also very difficult to remove; they can hardly be taken off without leaving a residue.

BRIEF SUMMARY

It is an object of the present invention to disclose a method by which a scale can be mounted as free of drift as possible, but removably, on a support This object is attained by a method for mounting a scale having a measuring graduation, the method including positioning a scale on a support, wherein the scale includes a measuring graduation. The method includes maintaining the scale on the support via a mounting force by providing electrostatic clamping between the scale and the support.

It is a further object of the present invention to disclose an arrangement having a support and a scale which is releasably, but yet stably, fastened thereon.

This object is attained in accordance with a measuring arrangement including a support and a scale having a measuring graduation, wherein the scale is fixed on the support by a mounting force generated via electrostatic clamping.

Advantages of the present invention can be taken from the description of exemplary embodiments. These exemplary embodiments will be explained in what follows by the drawings.

BRIEF DESCRIPTION OF THEE DRAWINGS

DETAILED DESCRIPTION OF THE PREFERRED EMBODIMENTS

One basis of the present invention, and therefore of all the following exemplary embodiments, is the mounting of a scale 1 on a support 2 by electrostatic clamping. This electrostatic clamping is based on the attraction of two oppositely charged bodies. In this case the scale 1 in accordance with the present invention is fastened on the support 2 by direct electrostatic clamping. A potential gradient between the bodies which are to be held together, namely the scale 1 and the support 2, is generated by applying an electrical voltage U.

Figure 19:
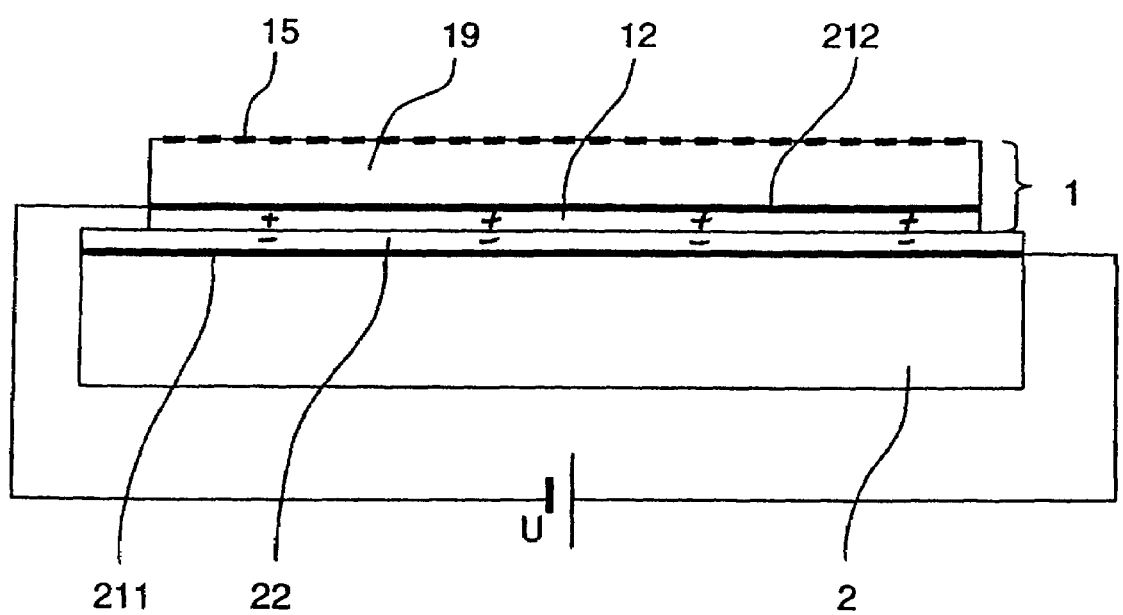
FIG. 19 is a lateral view of a fifteenth exemplary embodiment of a measuring arrangement with a support and scale fastened thereon in accordance with the present invention.

A differentiation is made between unipolar electrostatic clamping and bipolar electrostatic clamping. In connection with unipolar electrostatic clamping, only represented in the drawings by FIG. 19, each one of bodies 1 and 2 to be clamped has respectively one voltage-conducting electrode 211, 212 as the anode or cathode, which is charged with a voltage U, because of which the two oppositely located electrodes 211, 212 are oppositely charged. Here, the support 2 should be designed as a voltage-conducting electrode (electrically-conducting material or semiconductor material), or with a voltage-conducting electrode (in particular coating with an electrically-conducting material or semiconductor material), and the scale 1, having a measuring graduation 15, as counter-electrode (made of electrically-conducting material or semiconductor material or coating of a scale made of non-conducting material with an electrically-conducting material or semiconductor material). A dielectric device 12, 22 should be provided between the electrodes 211, 212, in the example represented a dielectric layer 12 has been applied to the substrate 19 of the scale 1 and a dielectric layer 22 to the support 2. It is disadvantageous in connection with this mounting that both the scale 1 and the support 2 must be provided with an electrical connection.

In bipolar electrostatic clamping, voltage-conducting electrodes which are connected to the voltage source are arranged together on one of the bodies to be connected, and the electrode at the other body constitutes a sort of coupling electrode, in whose area, which is located opposite the voltage-conducting electrodes, counter-charges are formed. In this case the support 2 or the scale 1 can have the two voltage-conducting, i.e. contacted, electrodes. Bipolar clamping is to be preferred, since the contacting outlay can be limited to one component.

For mounting a scale 1 of a glass or a glass-ceramic material (for example the material soled under the trademark Zerodur), bipolar electrostatic clamping is therefore preferably employed. In this case both voltage-conducting electrodes, the anode 211 and the cathode 212, are provided together on the support 2, and the counter-electrode is respectively formed in an electrically-conducting body 11 of the scale 1. Therefore, bipolar electrostatic clamping has been realized in all particularly advantageous embodiments extensively explained in what follows, and the voltage-conducting electrodes 211, 212 are together arranged on the support body 2. This arrangement makes handling of the scale 1 easier, since only the support body 2 needs to be provided with electrical contacts and feed lines.

Elements which perform in a functionally identical manner are provided with the same reference symbols in all drawing figures. The thickness of the layers has been shown greatly magnified here.

Figure 1:
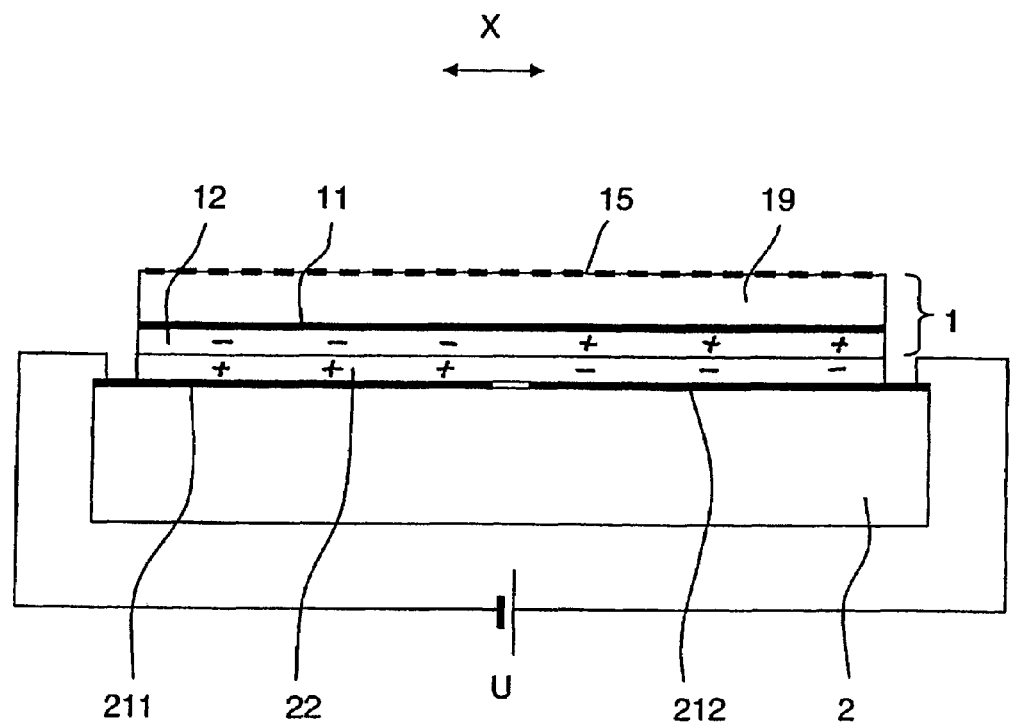
FIG. 1 is a lateral view of a first exemplary embodiment of a measuring arrangement with a support and scale fastened thereon in accordance with the present invention.
Figure 2:
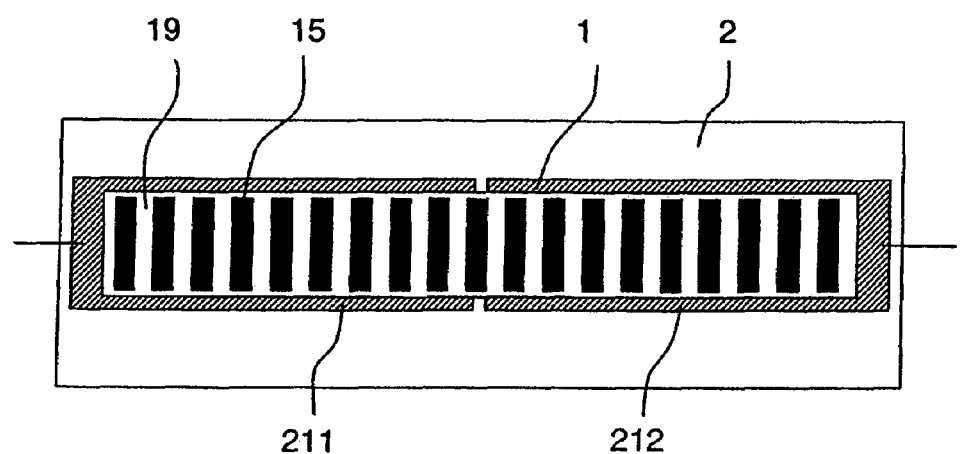
FIG. 2 is a view from above on the arrangement in accordance with FIG. 1.

A first exemplary embodiment of the present invention is represented in FIGS. 1 and 2. FIG. 1 shows a lateral view of the support 2 with the scale 1 mounted thereon by electrostatic clamping, and FIG. 2 is a view from above. The scale 1 has a measuring graduation 15 in the form of an incremental measuring graduation 15, which can be photoelectrically scanned in the measuring direction X for position measurement. The measuring graduation 15 can be a reflecting amplitude grating or a phase grating, which is used in a known manner for a highly accurate interferential position measurement.

The scale 1 includes a substrate 19 of a glass or a glass-ceramic material (for example the material sold under the trademark Zerodur) and has an electrode in the form of a conductive thin metal layer 11 on its underside, which is covered by a thin dielectric layer 12. On its top, the support 2 has an electrode in the form of a thin metallic layer 211, 212, which is also covered by a thin dielectric layer 22. The metallic layer 211, 212 of the support 2 is structured in the form of two separate voltage-conducting electrodes 211 and 212, which are charged with an electrical voltage U at outside-located contact points. In the example, the electrode 211 is embodied as an anode, and the electrode 212 as a cathode. Counter-charges in relation to the electrodes 211 and 212 are induced in the metallic layer 11 of the scale 1 by the voltage U, which result in holding forces pressing the scale 1 against the support 2. For reasons of illustration, the charges + and − have only been schematically drawn next to the electrodes 11, 211, 212. The contact pressure, p, being generated can be calculated by the following equation:

$$p = \tfrac{1}{2} * \in_0 * [(\in_R * U)/(d + a * \in_R)]^2,$$

wherein $\in_0$: = dielectric constant of the vacuum (=8.854·10$^{-12}$ F/m)

$\in_R$: = relative dielectric constant of the combination of the dielectric layer 12 of the scale 1 and the dielectric layer 22 of the support 2

U: voltage applied d: total thickness of both dielectric layers 12 and 22 on the scale 1 and the support 2 a: air gap (if existing) between the scale 1 and the support 2

For a contact pressure of 5 bar (5 mm Hg check) and a relative dielectric constant $\in_R$ of 10, a voltage U=34 V/μm is required, provided the air gap a=0. $Si_3N_4$, $Ta_2O_5$, $Y_2O_3$, $Al_2O_3$ or AlN are advantageous dielectric elements. They have a high relative dielectric constant $\in_R$ and a high dielectric strength.

For $Ta_2O_5$, which has a relative dielectric constant $\in_R$=28 and a dielectric strength of up to 450 V/μm, with a layer thickness of d=2 μm, only a voltage U=24 V is required for achieving a contact pressure of 5 bar. Therefore the occurring field strength remains far below the dielectric strength of the dielectric element.

Typical layer thicknesses for the metallic layers 11 and 211, 212, which constitute the electrodes, lie between 20 nm and 2 μm, those for the dielectric elements 12 and 22 between 50 nm and 400 μm. Low-stress metals, such as aluminum, are advantageous as material for the metallic layers 11 and 211, 212. Transparent and electrically conductive layers "TCO" (transparent conductive oxide), such as InSnO, ZnO or SnO, can also be employed as electrodes. This is advantageous if it is intended for beams of light to penetrate the transparent scale 1 and the transparent support 2, which can be advantageous for uses in lithographic devices, for example.

In the first exemplary embodiment, the contact faces of the scale 1 and the support 2 touching each other are respectively constituted by the dielectric elements 12 and 22. These contact faces are designed with large surfaces extending at least to a large degree over the entire area of the scale 1.

In an advantageous manner, the surfaces at which the scale 1 is in contact with the support 2 (contact faces) can also be embodied in such a way that the surfaces of the scale 1 and the support 2 facing each other (mounting faces) do not touch each other in their entirety. In this case raised areas 23, which are spaced apart from each other, are formed on the scale 1 and the support 2 and constitute the contact surfaces. This has the advantage that, in the course of putting the scale 1 and the support 2 together, air can escape from the space between them to the exterior through the channels 24 between the raised areas 23. Such embodiments are represented in FIGS. 3 to 9, 11, 12, 15, 16 and 18.

Figure 3:
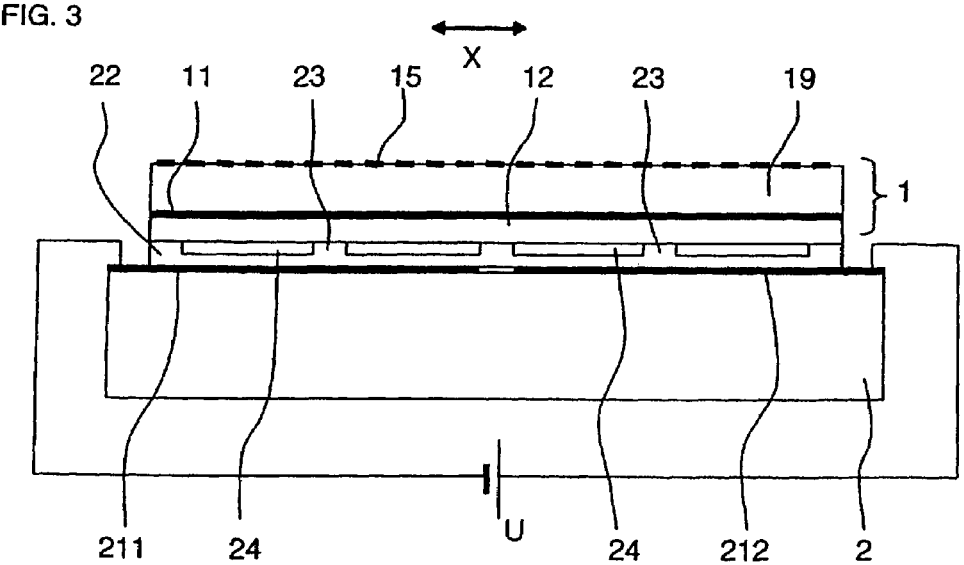
FIG. 3 is a lateral view of a second exemplary embodiment of a measuring arrangement with a support and scale fastened thereon in accordance with the present invention.

In connection with the second exemplary embodiment represented in FIG. 3, the dielectric element 22 of the support 2 is structured in that raised areas 23 and depressions 24 have been alternatingly formed in it Because of this, the contact face is small in comparison with the mounting face and is distributed in a plurality of small individual faces over the mounting face. On the one hand, an almost even distribution of the mounting force is achieved by this, and on the other hand the risk of a grain of dust coming to rest in the area of the contact faces and distorting the scale 1 is minimized. Because of this, the requirement for the mounting face being free of dust is considerably lowered. Structuring of the dielectric element 22 can be achieved either by a spot reduction of the thickness, or by complete removal. In a manner not represented, the formation of the raised areas 23 and depressions 24 can alternatively or additionally also take place on the part of the scale 1 in that the dielectric element 12 of the scale 1 is alternatively or additionally appropriately structured.

Figure 4:
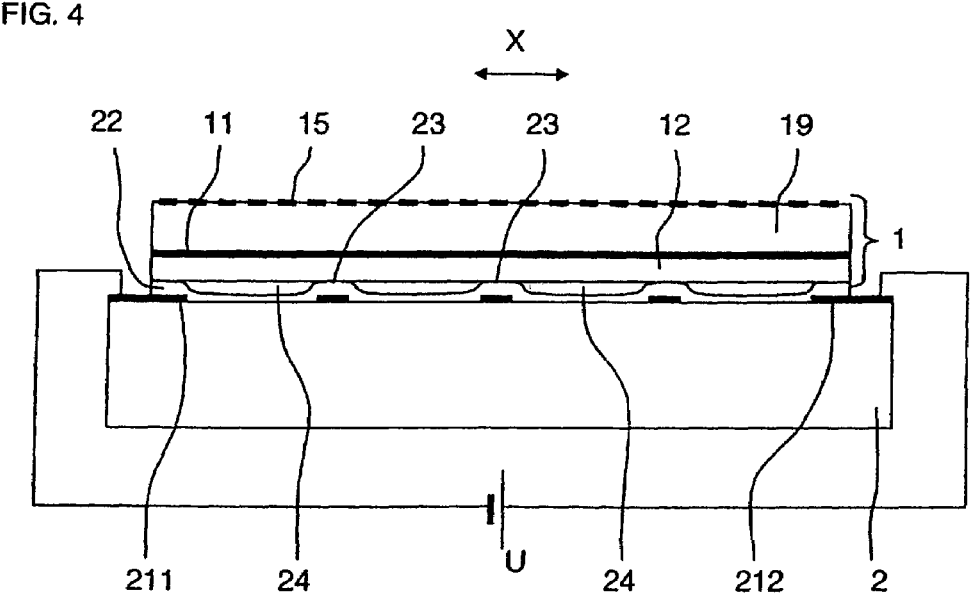
FIG. 4 is a lateral view of a third exemplary embodiment of a measuring arrangement with a support and scale fastened thereon in accordance with the present invention.

Alternatingly arranged raised areas 23, which form outward leading channels 24 located between the raised areas 23, can also be formed by a structured metallic layer 11 of the scale 1 and/or a metallic layer 211, 212 of the support 2. A raised profile is created by this and the dielectric element 12, 22 is applied two-dimensionally, as represented in FIG. 4 by the metallic layers 211, 212 of the support 2. Preferably the channels 24 are continuously open as far as to the area of the exterior, so that a pressure equalization can take place and possibly entrained air can escape.

Figure 5:
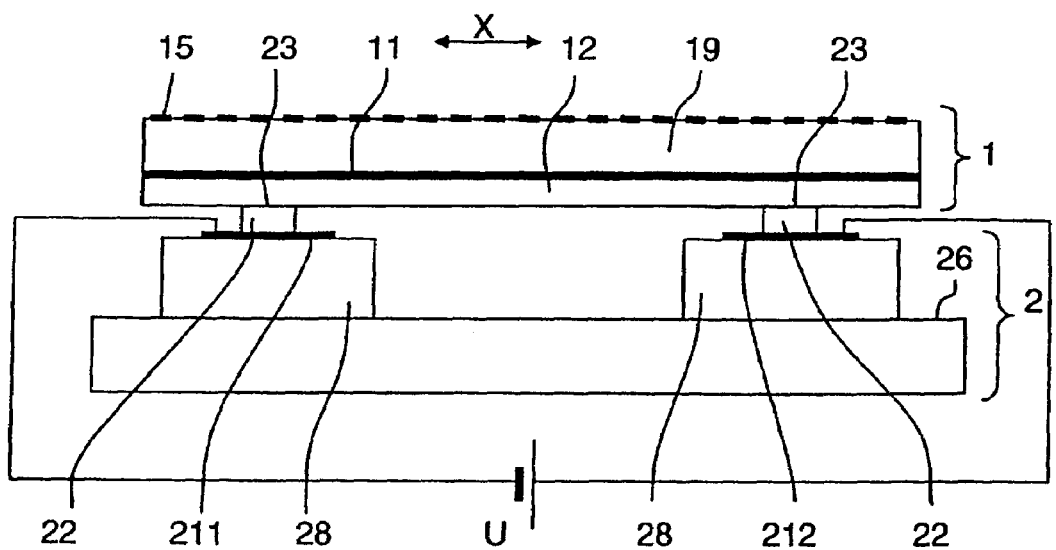
FIG. 5 is a lateral view of a fourth exemplary embodiment of a measuring arrangement with a support and scale fastened thereon in accordance with the present invention.
Figure 6:
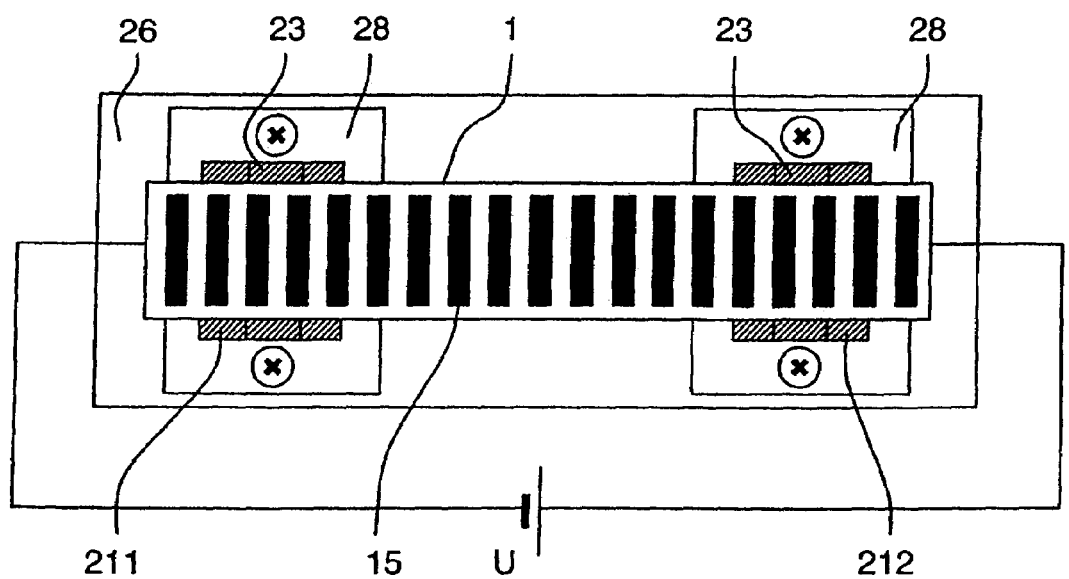
FIG. 6 is a view from above on the arrangement in accordance with FIG. 5.

In the embodiment in accordance with FIGS. 5 and 6 the raised areas 23 are placed as contact faces in the area of the Bessel points of an elongated scale 1. The raised areas 23, which constitute the support for the scale 1 in the area of the Bessel points, assure minimal distortion of the scale 1 because of the force of gravity. The electrodes are arranged symmetrically with respect to the Bessel points, and therefore to the support surfaces, so that no resultant torque acts on the scale 1 in the area of the support. The advantage of this embodiment lies in that the flatness of the support 2 has at most a negligible effect on the distortion and flatness of the scale 1, so that it therefore need not be manufactured so precisely. In actual use, an extremely high accuracy of a position measuring arrangement is achieved by such an arrangement of the scale 1 and support 2.

In this case the support 2 includes support elements 28 on a base body 26. The support elements 28 can be bonded, glued, clamped or screwed on the base body 26. It is also possible to arrange solid state joints between the support elements 28 and the base body 26 which, on the one hand, do not transmit the screw-on forces to the scale 1 and/or permit, on the other hand, a linear expansion of the scale 1 relative to the base body, which is as free of forces as possible.

Figure 7:
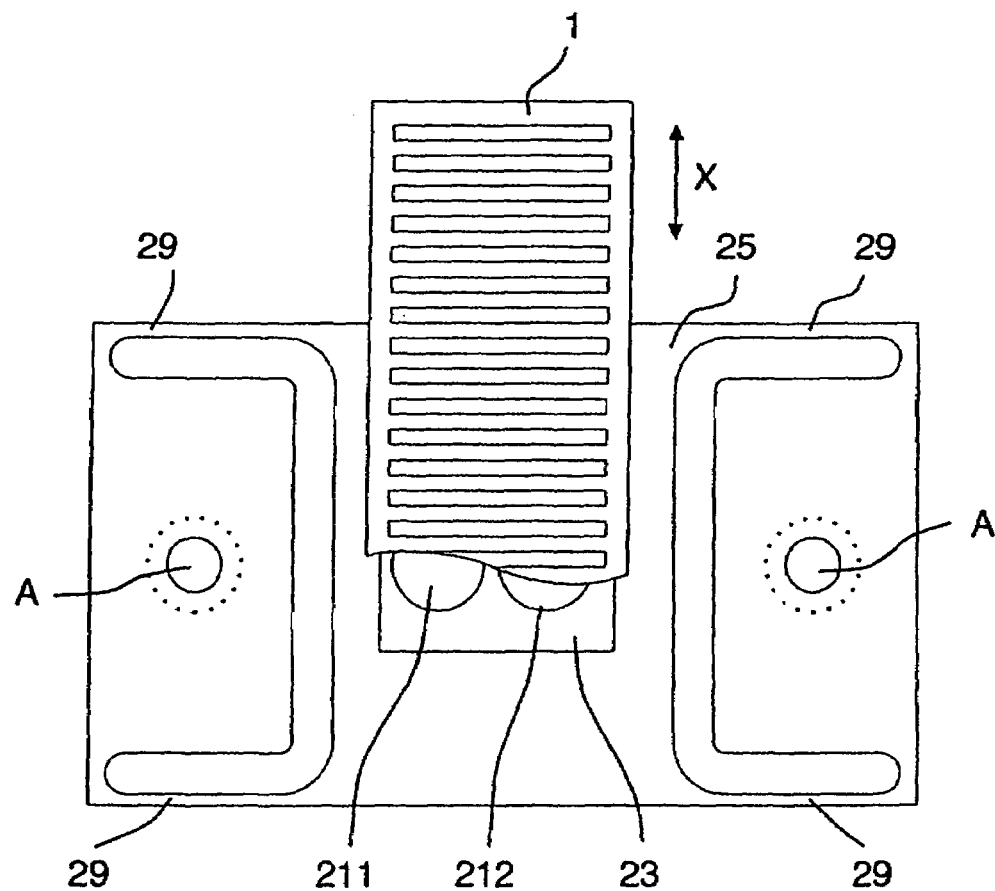
FIG. 7 is a view from above on a fifth exemplary embodiment of a measuring arrangement with a fastened scale in accordance with the present invention.
Figure 8:
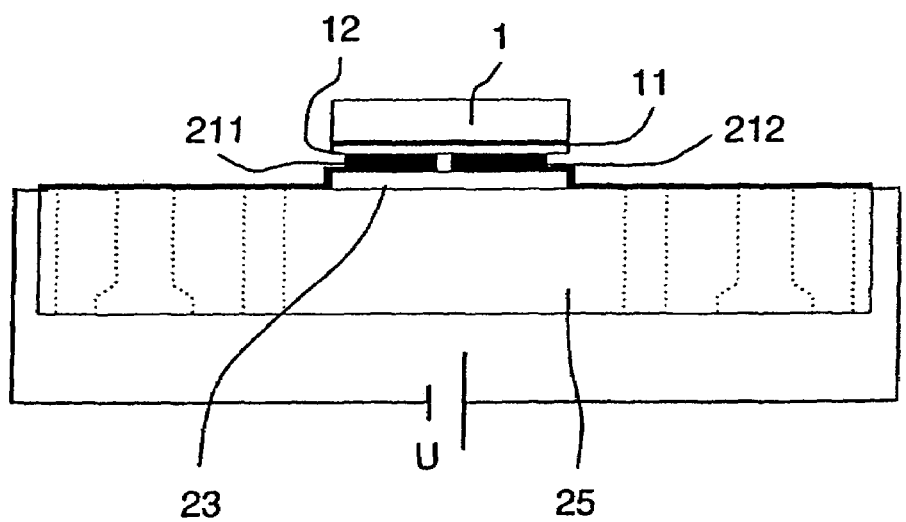
FIG. 8 is an arrangement in accordance with FIG. 7 in cross section.

A possible arrangement with solid state joints is represented in FIGS. 7 and 8. A view from above on a support element 25 with solid state joints 29 arranged on both sides of the scale 1 is represented in FIG. 7. The solid state joints 29 are strips of material extending transversely with respect to the measuring direction X, which permit a movement of the support element 25, directed in the measuring direction X, relative to the screw-on location A. The screw-on location A is used for the stationary fixation in place of the support element 25 on a base body 26 represented in FIGS. 5 and 6.

FIG. 8 shows a cross section of this arrangement. The electrodes 211, 212 attached to the support element 25 are connected to an electric voltage U and work together with the electrode 11 attached to the scale 1. The dielectric element 12 is provided between the respective electrodes 211 and 11, as well as 212 and 11.

Figure 9:
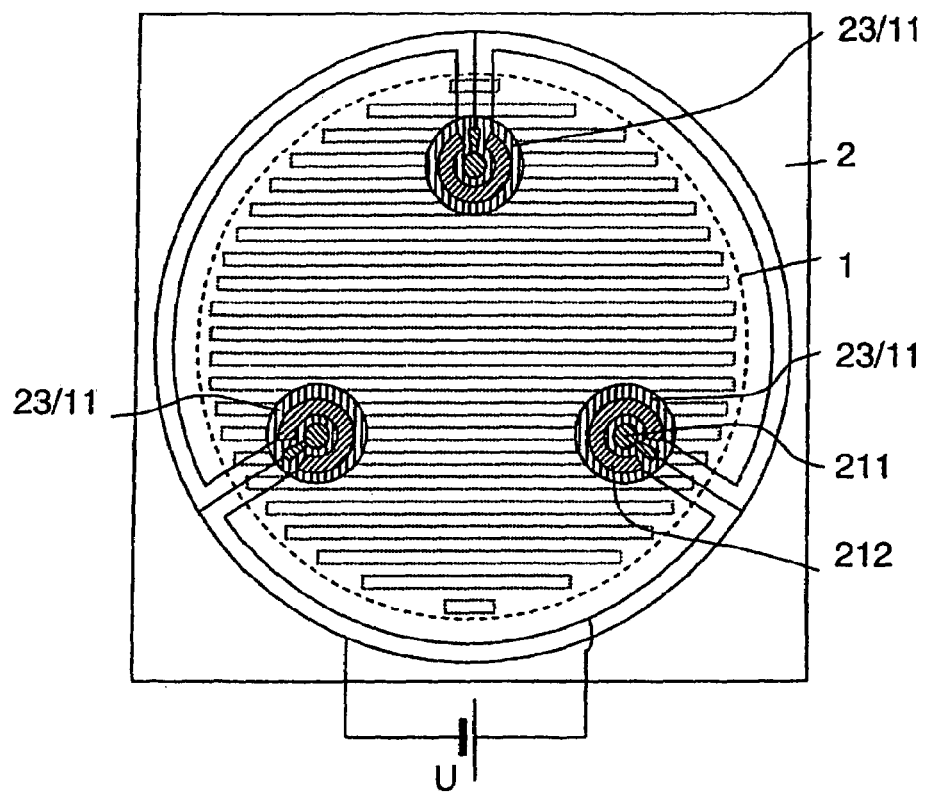
FIG. 9 is a view from above on a sixth exemplary embodiment of a measuring arrangement with a support and a scale fastened thereon in accordance with the present invention.

FIG. 9 shows the electrostatic clamping of a flat two-dimensionally extending scale 1, such as is customary, for example, in connection with two-dimensionally measuring cross-grating measuring devices. Three symmetrically arranged raised areas 23, offset by 120°, are provided here. The radial distance from the center has been selected such that, in spite of the force of gravity, the smallest possible angle of inclination or the greatest possible flatness is achieved. Here, the electrodes 11 on the scale 1 are intended to be substantially restricted to the electrode faces 211, 212 of the support 2 and are advantageously embodied to be bipolar.

Figure 10:
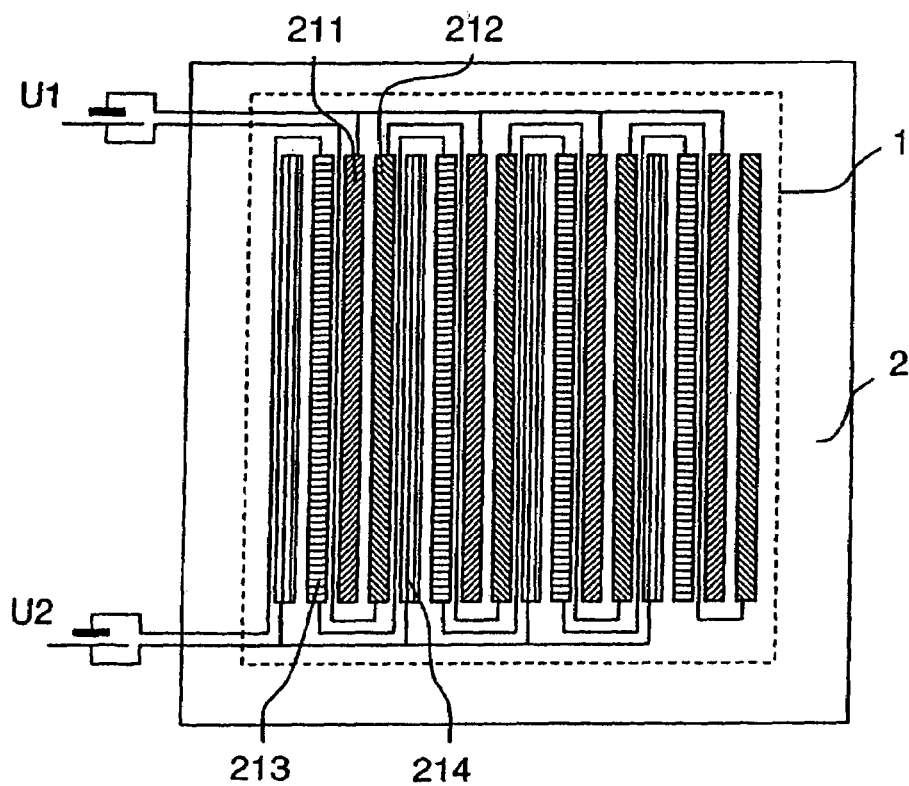
FIG. 10 is a view from above on a seventh exemplary embodiment of a measuring arrangement with a support and a scale fastened thereon in accordance with the present invention.

In the embodiment in accordance with FIG. 10, two pairs of electrodes 211, 212 and 213, 214, which are independent of each other, are provided, and are fed from two independent voltage sources U1, U2. If one of the voltage supplies fails, the scale 1 still remains fastened. For increasing dependability, it is of course possible to provide still further pairs of electrodes and independent voltage supplies. This embodiment is particularly advantageous when batteries are provided as voltage sources. The electrode structures 211, 212, as well as 213, 214, which are respectively assigned to a voltage source, should be distributed over the mounting face, if possible.

Figure 11:
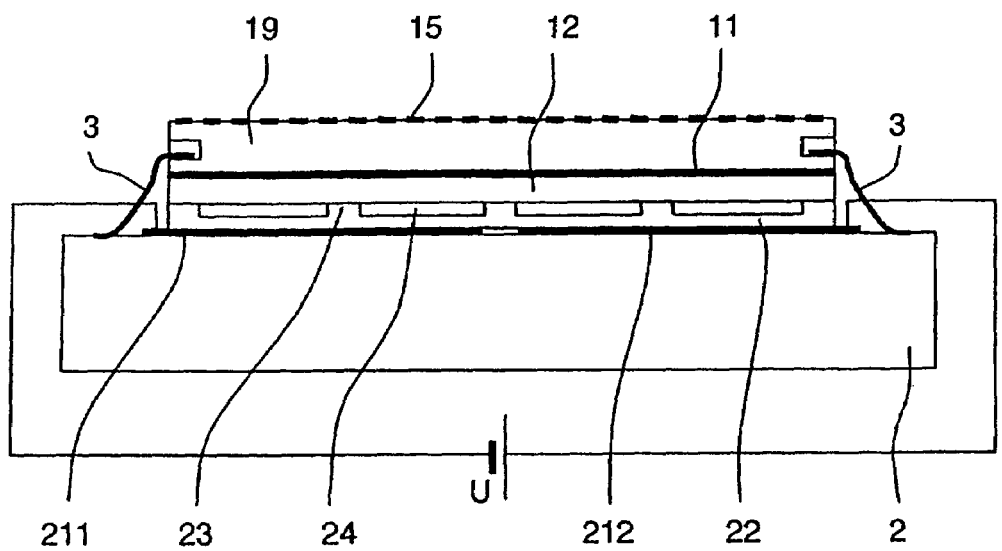
FIG. 11 is a lateral view of an eighth exemplary embodiment of a measuring arrangement with a support and scale fastened thereon in accordance with the present invention.

The exemplary embodiment in accordance with FIG. 11 corresponds to a large extent to the embodiment in accordance with FIG. 3, except for the provision of additional mechanical fastening elements 3, which still keep the scale 1 securely fastened if the voltage supply fails. The fastening elements 3 fix the scale 1 advantageously in place at locations which lie far from a measuring graduation 15 for position measurement. The fastening elements 3 can be spring elements which engage pockets machined in the edge faces of the scale 1.

Figure 12:
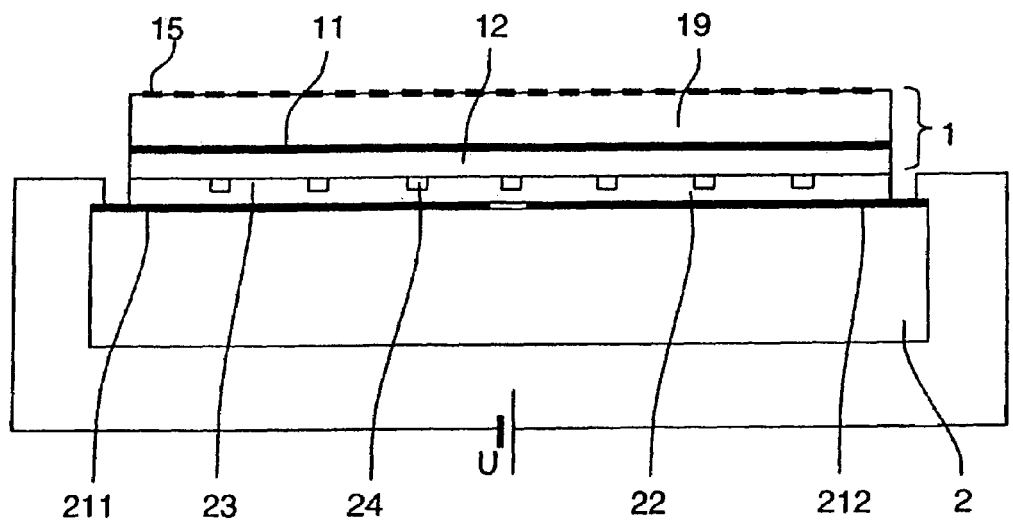
FIG. 12 is a lateral view of a ninth exemplary embodiment of a measuring arrangement with a support and scale fastened thereon in accordance with the present invention.

The embodiment represented in FIG. 12 combines the mounting type of bonding with the one of electrostatic clamping. To this end, the outer faces of the dielectric element 12 of the scale 1 and of the dielectric element 22 of the support 2 facing each other are bonded together. If the roughness of the dielectric elements 12, 22 is not sufficiently small, they still need to be lightly polished after the application of the layer (vapor deposition, sputtering, or plasma process PECVD). No redundant embodiment with several electrode pairs is required with this type of mounting, because a sufficient pressure force is always available. The electrostatic clamping prevents the peeling-off of the bond, since the long range electrostatic forces assure sufficient contact pressure even in case of bad local contact conditions, in which the short range van der Waals force already become very weak, or even do not exist at all anymore. The contact faces are advantageously interrupted, so that no air bubbles are enclosed in the contact faces during mounting, or that the remaining amounts of air in the contact faces can escape in a short time. In this case the embodiment of the electrostatic clamping corresponds to that in the exemplary embodiment in accordance with FIG. 3.

Figure 13:
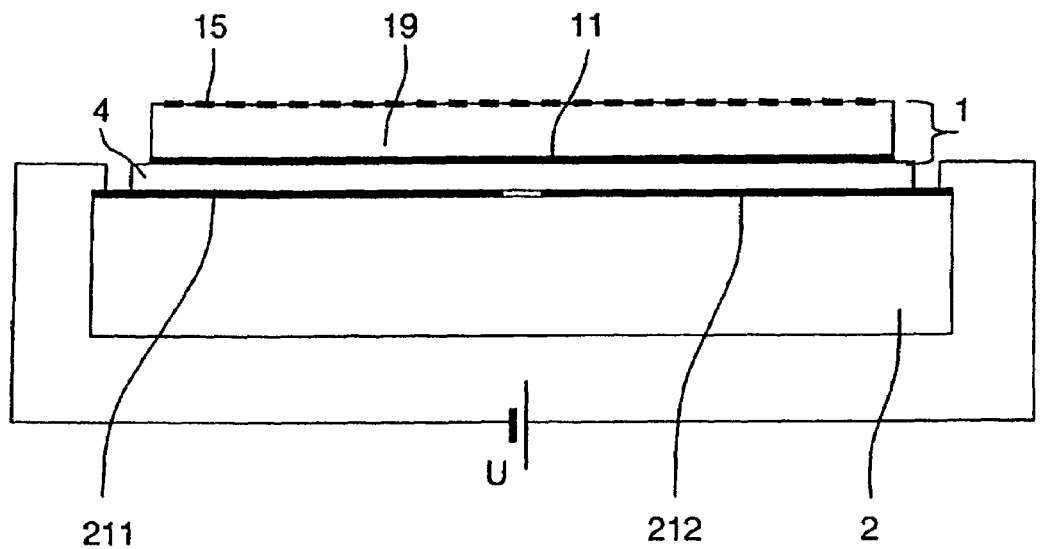
FIG. 13 is a lateral view of a tenth exemplary embodiment of a measuring arrangement with a support and scale fastened thereon in accordance with the present invention.

In the exemplary embodiment in accordance with FIG. 13, the dielectric element 12, 22 of the previous examples has been realized by a thin foil 4, which is inserted between the scale 1 and the support 2. In this case the scale 1 and the support 2 only need to be provided with a simple electrode layer 11, 211, 212, which can take place in the course of a vapor deposition step. Costs can be considerably reduced in this case. Plastic foils, for example made of the material sold under the trademark of Teflon, are possible, but also foils of thin glass. Advantageously the foil thickness lies within the range of 20 to 400 μm. This mounting type is particularly advantageous if scales 1 made of metal are used. They can be inserted without a coating, since they themselves constitute the electrode 11.

Figure 14:
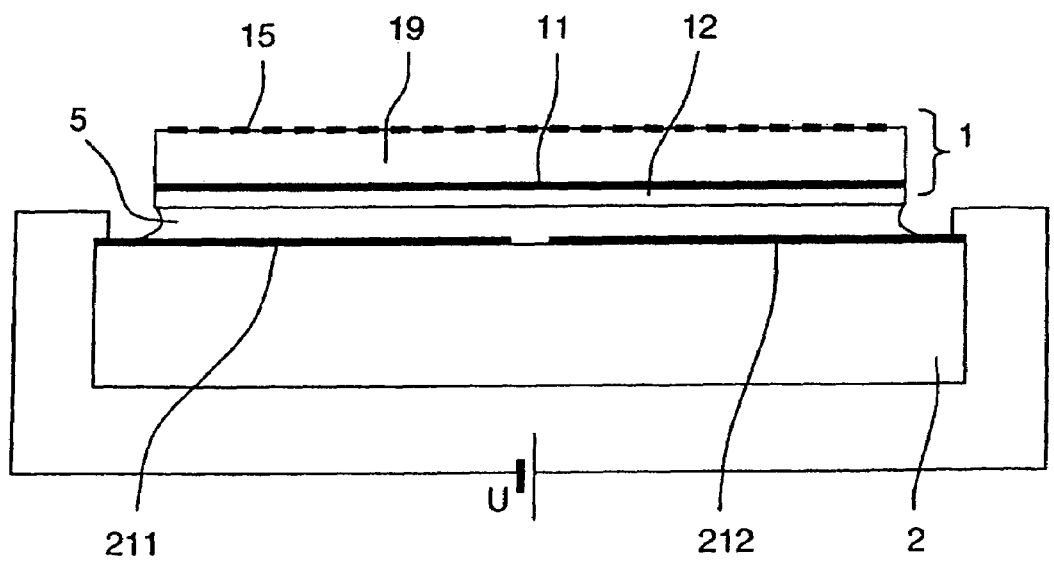
FIG. 14 is a lateral view of an eleventh exemplary embodiment of a measuring arrangement with a support and scale fastened thereon in accordance with the present invention.

With the exemplary embodiment in accordance with FIG. 14, an oil film 5 is inserted between the dielectric element 12 of the scale 1 and the outside metallic layer 211, 212 of the support 2. Because of capillary forces, it remains restricted to the very thin gap area. For one, this oil film 5 prevents the trapping of small volumes of air between the scale 1 and the support 2, in which corona discharges could occur with high field strengths. Furthermore, in case of different thermal expansion or distortion of the support 2, the scale 1 can slide over the oil film 5 and maintain its length in this way. This type of mounting is of particular interest if the support 2 shows a large thermal expansion (such as with aluminum, for example), and the scale 1 a very small thermal expansion (such as with the material sold under the trademark Zerodur, for example).

Figure 15:
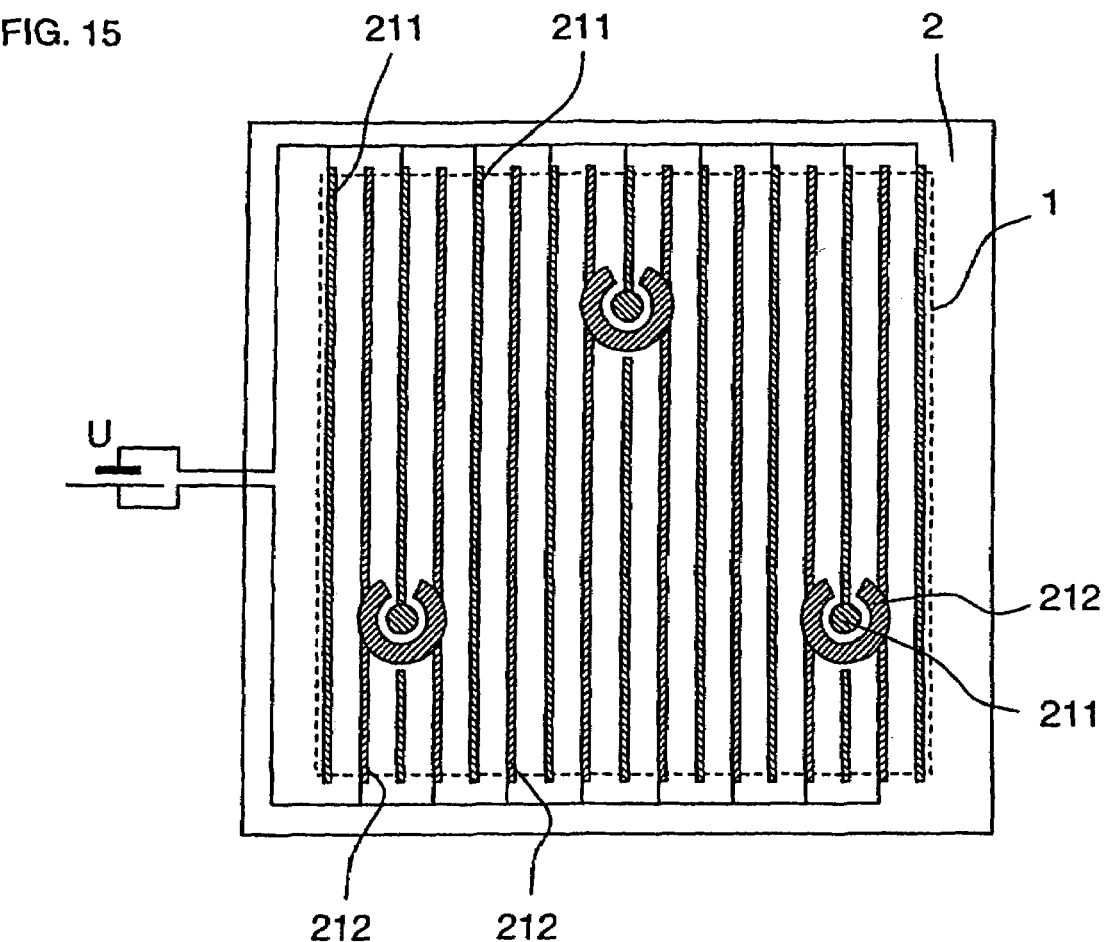
FIG. 15 is a view from above on a twelfth exemplary embodiment of a measuring arrangement with a support and a scale fastened thereon in accordance with the present invention.
Figure 16:
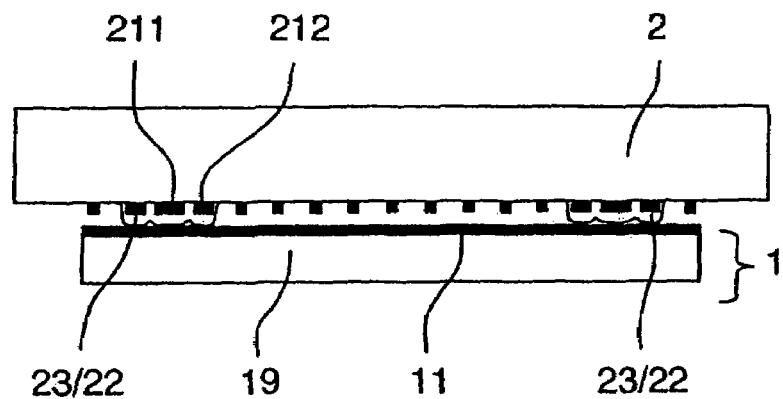
FIG. 16 is the arrangement in accordance with FIG. 15 in cross section.

An advantageous kinematic three-point mounting of a two-dimensional scale 1 (in particular a cross-grating plate), which is mounted on the support 2 in a hanging manner, is represented in FIGS. 15 and 16. FIG. 15 shows the view from above on the spatial arrangement of the electrodes 211, 212 on the support 2, and FIG. 16 a cross section in the area of two support points of the scale 1. The scale 1 again has the electrode 11, and the voltage-conducting electrodes 211 and 212 are arranged on the support 2. The scale 1 rests on the support 2 on only three raised areas 23, which are arranged two-dimensionally distributed. The raised areas 23 are constituted by areas of the dielectric element 22 of the support 2, which are arranged in the form of points. When the scale 1 is fixed in place at only three points, it is deformed by the force of gravity. This deformation can be compensated by a corresponding contact pressure, which is generated by electrostatic clamping, and exactly corresponds to and opposes the force of gravity, but must clearly be less than the contact pressure in the area of the contact faces. For this purpose, electrodes 211, 212 of larger surface than in the remaining area outside of the raised areas 23 are arranged. Here the goal is to achieve a large degree of flatness, and therefore a high degree of accuracy of the scale 1. The reduced contact pressure outside of the raised areas 23, and therefore outside of the contact faces, can be achieved in a simple manner by an appropriate structuring with narrow, but widely spaced apart electrode faces 211, 212. However, in the area of the contact points the occupation of the area by electrodes 211, 212 must be dense. Alternatively, the raised areas 23 (contact faces) and the remaining mounting faces can each be occupied by two independent electrode pairs and supplied by separate voltage sources. It is therefore possible to vary the holding force over an area of the scale 1 as a function of the location of the electrode pairs by a simple selection of the voltage, and to minimize deformations of the scale 1.

Figure 17:
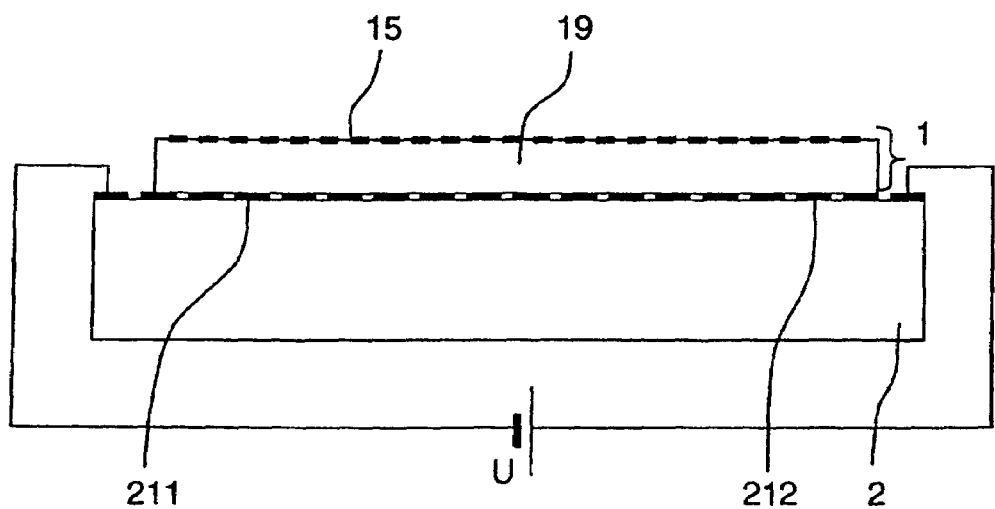
FIG. 17 is a lateral view of a thirteenth exemplary embodiment of a measuring arrangement with a support and scale fastened thereon in accordance with the present invention.

In the embodiment represented in FIG. 17, electrodes are required only on the scale 1, or alternatively only on the support 2. A multiple arrangement of pairs of electrodes 211, 212 is provided on the support 2, which are respectively connected with each other in pairs. This arrangement and the effect resulting therefrom are explained, for example, in U.S. Pat. No. 5,838,529, the entire contents of which are incorporated herein by reference. For creating as inhomogeneous as possible an electric field, the electrode structures have short lateral spacing between 1 μm and 500 μm. In this embodiment the substrate of the scale 1 includes an almost insulating material which, however, has a definite amount of movable charges. Ions (for example Na+), or ionizable imperfections, can be movable charges, which permit the jumping of the charge from one imperfection to another. For example, sodium-containing types of glass and the material sold under the trademark Zerodur are suitable materials. Movable charges are now displaced into the scale 1 by the electrical field created by the electrodes 211, 212 of the support 2, so that an electrical charge is generated near the boundary surface to the support 2. In this case the charge is opposite to the charge on the adjoining electrode. An attractive force is generated by this difference in potential, which can attain astonishingly high values in actual use. The outlay for this embodiment is very small. Moreover, this embodiment has a still further advantage: when the voltage supply fails, the charge in the scale 1 is maintained in spite of this and decays only very slowly. It is easily possible to achieve decay times of several days. The attractive force also decays correspondingly. This provides an additional protection against short-term voltage disruptions.

This effect of the slowly decaying holding force can basically also be additionally used in connection with all off the above described embodiments if the dielectric elements 12 or 22 or 4, which contain movable charges, are employed. The contact pressure is also clearly higher, since the distances between the opposite charges are shorter (Johnson-Rahbeck effect). Making use of this effect is especially advantageous for mounting the scale 1 for highly accurate photoelectric position measurement, since here scales 1 made of a glass-ceramic material, in particular the material sold under the trademark Zerodur, are employed.

Figure 18:
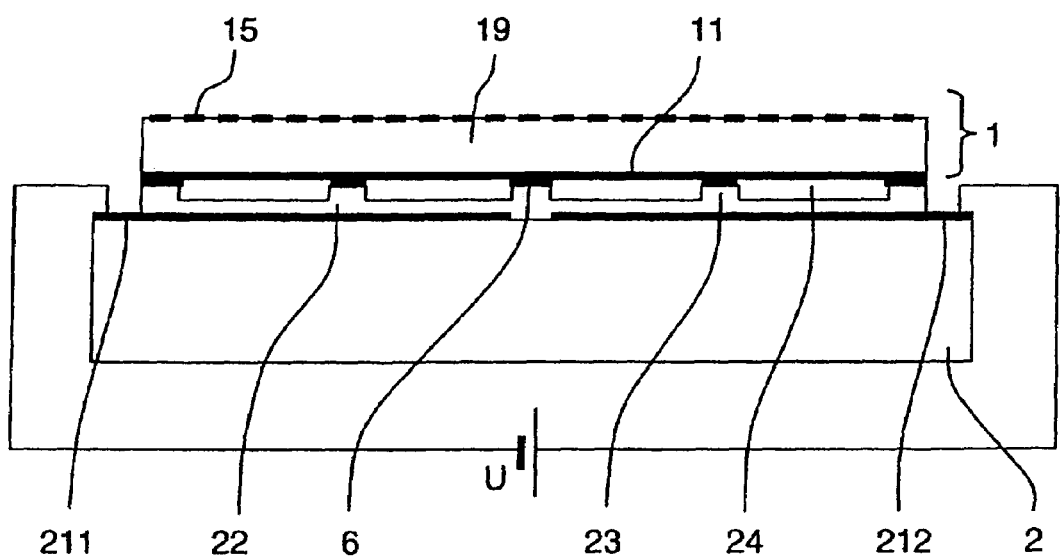
FIG. 18 is a lateral view of a fourteenth exemplary embodiment of a measuring arrangement with a support and scale fastened thereon in accordance with the present invention.

However, the above mentioned Johnson-Rahbeck effect can also lead to undefined contact pressures if the density of the movable charges or their mobility is unevenly distributed. Also, the slow increase of the contact pressures because of the decreased mobility in combination with not perfectly level scales 1 or supports 2 can lead to changing voltages in the scale 1. In these cases it is advantageous to suppress the Johnson-Rahbeck effect. An embodiment of this is represented in FIG. 18. The scale 1 is coated on the underside with a flat electrode 11, for example a metal layer 11. The support 2 carries an electrode pair 211, 212, which is covered with a dielectric element 22 and which is preferably embodied to be thicker for forming raised areas 23, which constitute contact points. The area between the raised areas 23 constitutes the channels 24. An electrically conductive layer, for example a metallic layer 6 which is in electrical contact with the electrode 11 of the scale 1, is applied to each of the raised areas 23 of the dielectric element 22. The influence of the movable charges in the dielectric element 22 is considerably weakened by this. Contact pressure is created only in the areas outside the contact faces, i.e. outside of the raised areas 23.

With all embodiments the layer structure of the scale 1 can be selected in such a way that the mechanical tensions created in the layers are compensated. For this purpose the layer material and the layer thickness are developed in such a way that the mechanical tensions compensate each other. Alternatively the layers (electrodes and/or dielectric elements) can have fine structuring.

If the measuring graduation 15 of the scale 1 is an electrically conductive material on an electrically non-conductive substrate (glass or glass-ceramic material), this measuring graduation 15 can also simultaneously constitute the electrode 11 of the scale 1. Here, the measuring graduation constituting the electrode 11 can be arranged on the surface of the substrate 19 which faces toward or away from the support 2 and can consist of a continuous or non-continuous layer, in particular a reflecting layer.

In a manner not shown, all structural elements of the scale 1 required for electrostatic clamping can be interchanged for those of the support 2.

As already mentioned, scales 1 with a two-dimensional measuring graduation 15, in particular a crossing measuring graduation, also called a cross graduation, are increasingly employed. In this case it is necessary to mount scales 1 of a relatively large format (approximately 40 cm×40 cm) on a surface of a support 2. The present invention can be advantageously employed in connection with lithographic devices in particular, where the support 2 on which the scale 1 is to be mounted includes a glass-ceramic material (for example the material sold under the trademark Zerodur) of a coefficient of expansion close to zero. Such a device having a scale with a two-dimensional measuring graduation is explained in U.S. Patent Application Publication No. US 2004/0263846 A1, the entire contents of which are incorporated herein by reference.

It may be required in this connection to have to fasten several scales 1 mosaic-like two-dimensionally next to each other on a machine surface 2 of approximately 1 m×2 m in order to cover the required measuring range of approximately 1 m×2 m. The scales 1, in particular those with a measuring graduation 15 which can be scanned photoelectrically, can only be produced relatively uncomplicated in the required quantities in sizes of approximately 40 cm ×40 cm. Each one of these scales 1 with a two-dimensional measuring graduation 15, also called cross graduation, can now be mounted in accordance with the invention on the machine element 2 as the support.

The basic advantages of the electrostatic clamping of the scale 1 on the support 2 are:

1) the force path is extremely short and only includes the area between the metallic layer 11 of the scale 1 and the metallic layer 211, 212 of the support 2. It therefore remains restricted to the volume of the dielectric element 12, 22. Thus the scale 1 and the support 2 remain almost entirely free of tension. In actual use, remaining tensions in the scale 1 are only created if the contact faces are not flat. The specification of the levelness must be laid out in accordance with the requirements.

2) The contact pressure is evenly distributed over the contact faces. Even if small dust particles are embedded between the contact faces, the contact pressure is hardly affected by this because the dependence on the distance only decreases at $1/d^2$. But the van der Waals forces of a bond decrease by $1/d^6$ and remain restricted to atomic distances only. Therefore the contact pressure of a bond is in actuality very uneven and undefined. If the contact pressure is unevenly distributed and the scale and the support expand unevenly thermally, local displacements between the scale and the support can occur, something which cannot be accepted in connection with highly accurate applications.

3) The electrostatic connection can be released, defective scales 1 can be replaced if required. With a suitable selection of the dielectric element 12 and 22, its thickness and dielectric strength, as well as the applied voltage U, the solidity of the electrostatic connection can exceed that of a bond.

4) Because of the extremely short force path, with correspondingly flat contact faces, the deformation of the scale 1 remains extremely small. Because of this, high drift stability and accuracy is achieved.

5) If different thermal expansions of the scale 1 and the support 2 exist, distortion of the scale 1 can occur in case of temperature changes, which results in measuring errors. In actual use, this occurs, for example, in case of a scale 1 made of the material sold under the trademark Zerodur and a support 2 with large thermal expansion, such as aluminum, for example. The contact force (clamping force, holding force) can be released in case of a brief switch-off of the voltage U, so that the distortions of the scale 1 are compensated again. Full measuring accuracy is achieved again. The time intervals between the short-time voltage switch-offs can be adapted to typical time intervals for relevant temperature changes. The entire process can be electronically controlled without manual intervention.

6) The surfaces at which the scale 1 is in contact with the support 2 (contact faces), and the surfaces used for force introduction (oppositely located and overlapping electrodes 11 of the scale 1 and electrodes 211, 212 of the support 2) can be arbitrarily structured and need not be identical with the entire facing surfaces of the scale and support (mounting face), as in case of bonding.

7) In contrast to bonding, the scale 1 and/or the support 2 can also remain unpolished in the area of the mounting faces, or contact faces, which can lower the expense considerably. In some embodiments with only a few contact faces, in particular with a three-point seating (kinematic support), the requirements made on the levelness of the mounting faces are also omitted. This, too, can lower the production costs considerably.

The foregoing description is provided to illustrate the present invention, and is not to be construed as a limitation. Numerous additions, substitutions and other changes can be made to the present invention without departing from its scope as set forth in the appended claims.

We claim:

1. A measuring arrangement comprising:
   a support;
   a scale comprising:
      a measuring graduation; and
      an electrically non-conductive substrate selected from the group consisting of glass and a glass-ceramic material, wherein said scale is fixed on said support by a mounting force generated via electrostatic clamping by a plurality of electrodes, wherein said measuring graduation is situated on one side of said substrate and one of said plurality of electrodes is provided on a surface of another side of said substrate situated directly opposite said measuring graduation, wherein said one of said plurality of electrodes is made of a coating of an electrically-conducting material, and wherein said electrostatic clamping occurs on said surface of said scale situated directly opposite said measuring graduation.

2. The measuring arrangement in accordance with claim 1 wherein said scale comprises a first electrode of said plurality of electrodes and said support comprises a second electrode of said plurality of electrodes and wherein an electrical voltage is applied between said first electrode and said second electrode, wherein said first electrode and said second electrode are arranged and embodied in such a way that, with said electrical voltage applied, a potential difference is created between said first electrode and said second electrode, which generates said mounting force.

3. The measuring arrangement in accordance with claim 2, further comprising a dielectric element arranged between said first electrode and said second electrode.

4. The measuring arrangement in accordance with claim 1, further comprising a mechanical contact between said scale and said support takes place at several raised areas of said scale that are spaced apart from each other.

5. The measuring arrangement in accordance with claim 4, wherein said raised areas constitute a kinematic three-point seating between said scale and said support.

6. The measuring arrangement in accordance with claim 1, further comprising a liquid film arranged between said scale and said support.

7. The measuring arrangement in accordance with claim 6, wherein said liquid film is an oil film.

8. The measuring arrangement in accordance with claim 1, wherein said scale comprises a first electrode of said plurality of electrodes and a second electrode of said plurality of electrodes, and an electrical voltage is applied between said first electrode and said second electrode, and wherein said support is configured in such a way that as said electrical voltage applied a potential difference is created between said first electrode and said support, as well as between said second electrode and said support, which generates said mounting force.

9. The measuring arrangement in accordance with claim 1, wherein said support comprises a first electrode of said plurality of electrodes and a second electrode of said plurality of electrodes, and an electrical voltage is applied between said first electrode and said second electrode, and wherein said scale is configured in such a way that as said electrical voltage applied a potential difference is created between said first electrode and said scale, as well as between said second electrode and said scale, which generates said mounting force.

10. A measuring arrangement comprising:
a support;
a scale comprising a measuring graduation, wherein said scale is fixed on said support by a mounting force generated via electrostatic clamping; and
a mechanical contact between said scale and said support takes place at several raised areas spaced apart from each other, wherein said raised areas are arranged in Bessel points of said scale.

11. A measuring arrangement comprising:
a support;
a scale comprising a measuring graduation, wherein said scale is fixed on said support by a mounting force generated via electrostatic clamping, wherein said electrostatic clamping occurs directly on a surface of said scale situated opposite said measuring graduation; and
a mechanical contact between said scale and said support takes place at several raised areas of said scale that are spaced apart from each other, wherein said raised areas are arranged, two-dimensionally distributed, on a plane between said scale and said support, and channels are formed between said raised areas which lead to an exterior of the measuring arrangement.

12. A measuring arrangement comprising:
a support;
a scale comprising a measuring graduation, wherein said scale is fixed on said support by a mounting force generated via electrostatic clamping, wherein said mounting force varies over an area of said scale.

13. A measuring arrangement comprising:
a support;
a scale comprising a measuring graduation, wherein said scale is fixed on said support by a mounting force generated via electrostatic clamping, wherein said scale comprises a first electrode and a second electrode, and an electrical voltage is applied between said first electrode and said second electrode, and wherein said support is configured in such a way that as said electrical voltage applied a potential difference is created between said first electrode and said support, as well as between said second electrode and said support, which generates said mounting force; and wherein said support comprises a third electrode, wherein said first electrode, said second electrode and said third electrode are embodied and arranged in such a way that, with said electrical voltage applied between said first electrode and said second electrode, a respective potential difference is created between said first electrode and said third electrode, as well as between said second electrode and said third electrode, which generates said mounting force.

14. The measuring arrangement in accordance with claim 13, wherein said mounting force varies over an area of said scale, in that occupation of a surface of said scale with said first electrode, said second electrode and said third electrode vanes.

15. The measuring arrangement in accordance with claim 13, wherein said mounting force varies over an area of said scale, in that said electrical voltage applied between said first electrode and said second electrode varies over said area of said scale.

16. A measuring arrangement comprising:
a support; wherein said support comprises a first electrode and a second electrode, and an electrical voltage is applied between said first electrode and said second electrode, and
a scale comprising a measuring graduation, wherein said scale is fixed on said support by a mounting force generated via electrostatic clamping, wherein said scale is configured in such a way that as said electrical voltage applied a potential difference is created between said first electrode and said scale, as well as between said second electrode and said scale, which generates said mounting force; and wherein said scale comprises a third electrode, wherein said first electrode, said second electrode and said third electrode are embodied and arranged in such a way that, with said electrical voltage applied between said first electrode and said second electrode, a respective potential difference is created between said first electrode and said third electrode, as well as between said second electrode and said third electrode, which generates said mounting force.

17. The measuring arrangement in accordance with claim 16, wherein said mounting force varies over an area of said scale, in that occupation of a surface of said scale with said first electrode, said second electrode and said third electrode vanes.

18. The measuring arrangement in accordance with claim 16, wherein said mounting force varies over an area of said scale, in that said electrical voltage applied between said first electrode and said second electrode varies over said area of said scale.

19. The measuring arrangement in accordance with claim 16, wherein said third electrode is an electrically conductive layer of an electrically non-conductive substrate of said scale.

* * * * *

UNITED STATES PATENT AND TRADEMARK OFFICE
CERTIFICATE OF CORRECTION

PATENT NO. : 7,549,234 B2  Page 1 of 1
APPLICATION NO. : 11/715637
DATED : June 23, 2009
INVENTOR(S) : Wolfgang Holzapfel et al.

It is certified that error appears in the above-identified patent and that said Letters Patent is hereby corrected as shown below:

In the Claims

In column 12, claim 14, line 23, replace "vanes" with --varies--.

In column 12, claim 17, line 55, replace "vanes" with --varies--.

Signed and Sealed this

Twenty-second Day of September, 2009

David J. Kappos
*Director of the United States Patent and Trademark Office*